US011115298B2

(12) United States Patent
Nainar et al.

(10) Patent No.: US 11,115,298 B2
(45) Date of Patent: Sep. 7, 2021

(54) DIGITAL INTELLECTUAL CAPITAL-BASED SERVICE ASSURANCE FOR INTENT-BASED NETWORKING

(71) Applicant: Cisco Technology, Inc., San Jose, CA (US)

(72) Inventors: Nagendra Kumar Nainar, Morrisville, NC (US); Carlos M. Pignataro, Cary, NC (US); Joseph M. Clarke, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/601,926

(22) Filed: Oct. 15, 2019

(65) Prior Publication Data

US 2021/0111970 A1  Apr. 15, 2021

(51) Int. Cl.
*H04L 12/26* (2006.01)
*H04L 12/24* (2006.01)

(52) U.S. Cl.
CPC .......... *H04L 43/04* (2013.01); *H04L 41/0213* (2013.01); *H04L 41/0681* (2013.01)

(58) Field of Classification Search
None
See application file for complete search history.

(56) References Cited

U.S. PATENT DOCUMENTS

| | | | |
|---|---|---|---|
| 7,895,470 B2 * | 2/2011 | Nastacio | G06F 11/0709 714/25 |
| 8,799,230 B2 | 8/2014 | Pignataro et al. | |
| 10,127,144 B2 | 11/2018 | Johnston et al. | |
| 2009/0313279 A1 * | 12/2009 | Tomaszewski | G06F 16/2453 |
| 2013/0216928 A1 * | 8/2013 | Nakajima | H01M 16/00 429/447 |
| 2018/0077677 A1 * | 3/2018 | Birkner | H04W 64/003 |
| 2018/0219754 A1 * | 8/2018 | Udupi | H04L 41/16 |

OTHER PUBLICATIONS

VMware, Inc., "VMWAR E Smart Assurance", Datasheet, downloaded Sep. 30, 2019, 4 pages.
PathSolutions, Inc., "TotalView Network Features", downloaded Sep. 30, 2019, 2 pages.
CISCO, "Intent-Based Networking", White paper, C11-740210-00, Jan. 2018, 11 pages.

* cited by examiner

*Primary Examiner* — Andrew Lai
*Assistant Examiner* — Keith Follansbee
(74) *Attorney, Agent, or Firm* — Edell, Shapiro & Finnan, LLC

(57) ABSTRACT

A method is provided that involves obtaining service pre-conditions associated with a service to be supported in a network. The method includes providing a plurality of digital Intellectual Capital (IC) modules, and providing signature pre-condition logic that specifies one or more conditions that indicate relevancy of one or more digital IC modules. The method includes selecting, from the plurality of digital IC modules, based on the service pre-conditions and the signature pre-condition logic, one or more particular digital IC modules that are applicable to the service in the network. The method further includes determining information to be obtained from one or more nodes in the network based on the one or more particular digital IC modules, and obtaining the information from the one or more nodes in the network. The information is analyzed to determine whether the one or more specific operational issues are present in the network.

20 Claims, 6 Drawing Sheets

500

```
┌─────────────────────────────────────────────────────────┐
│  OBTAINING SERVICE PRE-CONDITIONS ASSOCIATED WITH A    │── 510
│         SERVICE TO BE SUPPORTED IN A NETWORK            │
└─────────────────────────────────────────────────────────┘
                            │
┌─────────────────────────────────────────────────────────┐
│  PROVIDING A PLURALITY OF DIGITAL INTELLECTUAL CAPITAL (IC) │── 520
│                         MODULES                         │
└─────────────────────────────────────────────────────────┘
                            │
┌─────────────────────────────────────────────────────────┐
│            PROVIDING SIGNATURE PRE-CONDITION LOGIC      │── 530
└─────────────────────────────────────────────────────────┘
                            │
┌─────────────────────────────────────────────────────────┐
│  SELECTING, FROM THE PLURALITY OF DIGITAL IC MODULES, ONE │
│  OR MORE PARTICULAR DIGITAL IC MODULES THAT ARE APPLICABLE │── 540
│              TO THE SERVICE IN THE NETWORK              │
└─────────────────────────────────────────────────────────┘
                            │
┌─────────────────────────────────────────────────────────┐
│  DETERMINING INFORMATION TO BE OBTAINED FROM ONE OR MORE │── 550
│                   NODES IN THE NETWORK                  │
└─────────────────────────────────────────────────────────┘
                            │
┌─────────────────────────────────────────────────────────┐
│   OBTAINING THE INFORMATION FROM THE ONE OR MORE NODES IN │── 560
│                        THE NETWORK                      │
└─────────────────────────────────────────────────────────┘
                            │
┌─────────────────────────────────────────────────────────┐
│  ANALYZING THE INFORMATION OBTAINED FROM THE ONE OR MORE │── 570
│                   NODES IN THE NETWORK                  │
└─────────────────────────────────────────────────────────┘
```

FIG.5

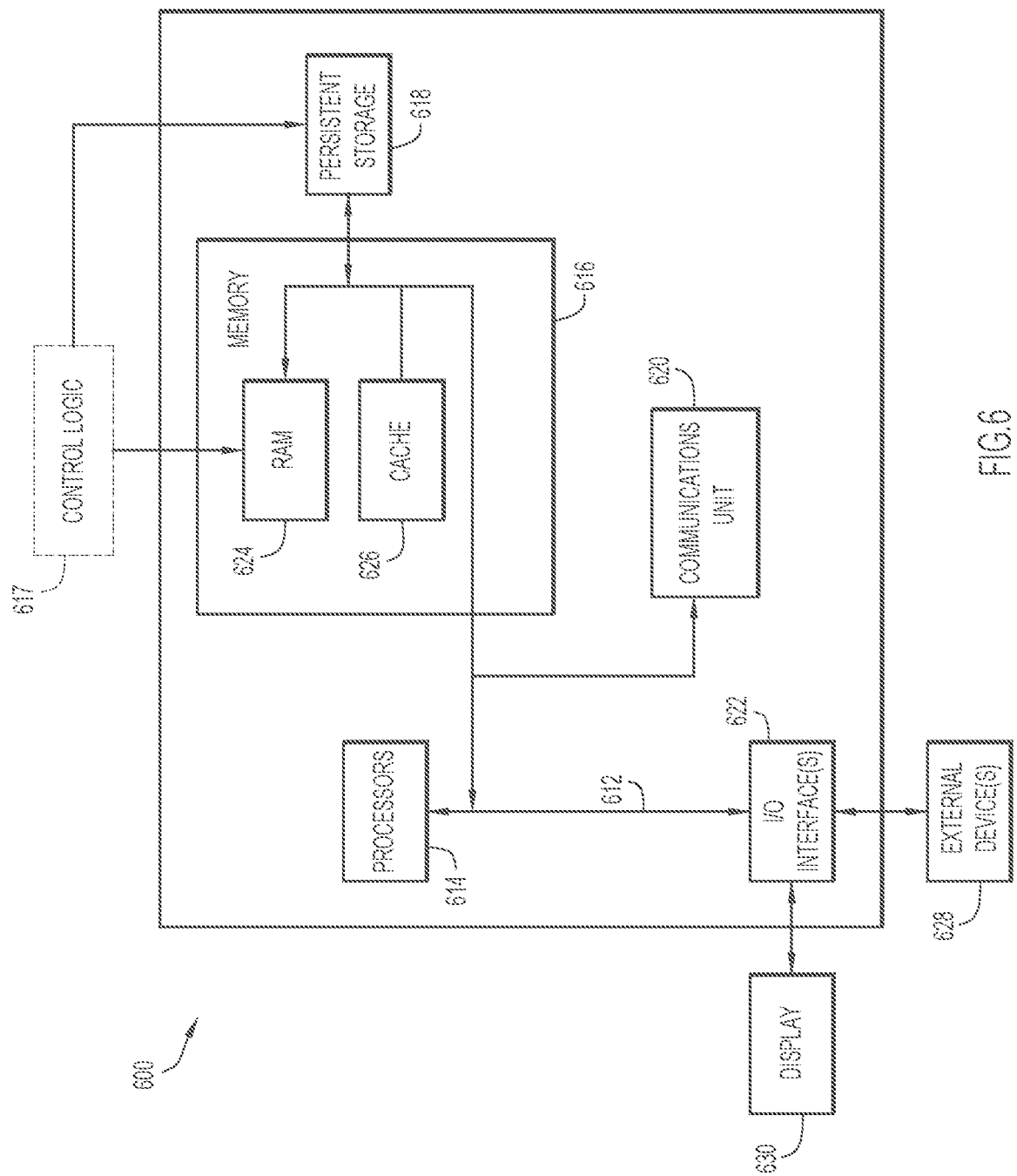

DIGITAL INTELLECTUAL CAPITAL-BASED SERVICE ASSURANCE FOR INTENT-BASED NETWORKING

TECHNICAL FIELD

The present disclosure relates to service assurance in a network.

BACKGROUND

Intellectual Capital (IC) associated with known issues or best practices associated with network devices running in a network can be used for expediting reactive support or to proactively provide additional services to network customers. Various diagnostic signatures (DSIG) are created and applied to the "show tech" or other outputs collected from network devices to proactively identify any known defects affecting one or more network devices.

BRIEF DESCRIPTION OF THE DRAWINGS

FIG. 5 is a flow chart of a method for digital IC-based service assurance, according to an example embodiment.

FIG. 6 is a block diagram of a computing device configured to perform the operations presented herein, according to an example embodiment.

DESCRIPTION OF EXAMPLE EMBODIMENTS

Overview

Techniques are presented herein for digital IC-based service assurance. In accordance with one embodiment a method is provided that involves obtaining service pre-conditions associated with a service to be supported in a network. The service pre-conditions specify one or more paths of one or more nodes in the network used for the service, one or more networking functions to be used in the network, and attributes of the one or more nodes used for the service. The method includes providing a plurality of digital IC modules, where each digital IC module is configured to detect one or more specific operational issues in the network, and providing signature pre-condition logic that specifies one or more conditions that indicate relevancy of one or more digital IC modules. The method includes selecting, from the plurality of digital IC modules, based on the service pre-conditions and the signature pre-condition logic, one or more particular digital IC modules that are applicable to the service in the network. The method further includes determining information to be obtained from one or more nodes in the network based on the one or more particular digital IC modules, and obtaining the information from the one or more nodes in the network. Using the information obtained from the one or more nodes in the network, the method includes analyzing the information to determine whether or not the one or more specific operational issues associated with the one or more particular digital IC modules, are present in the network for the service.

Example Embodiments

Figure 1:
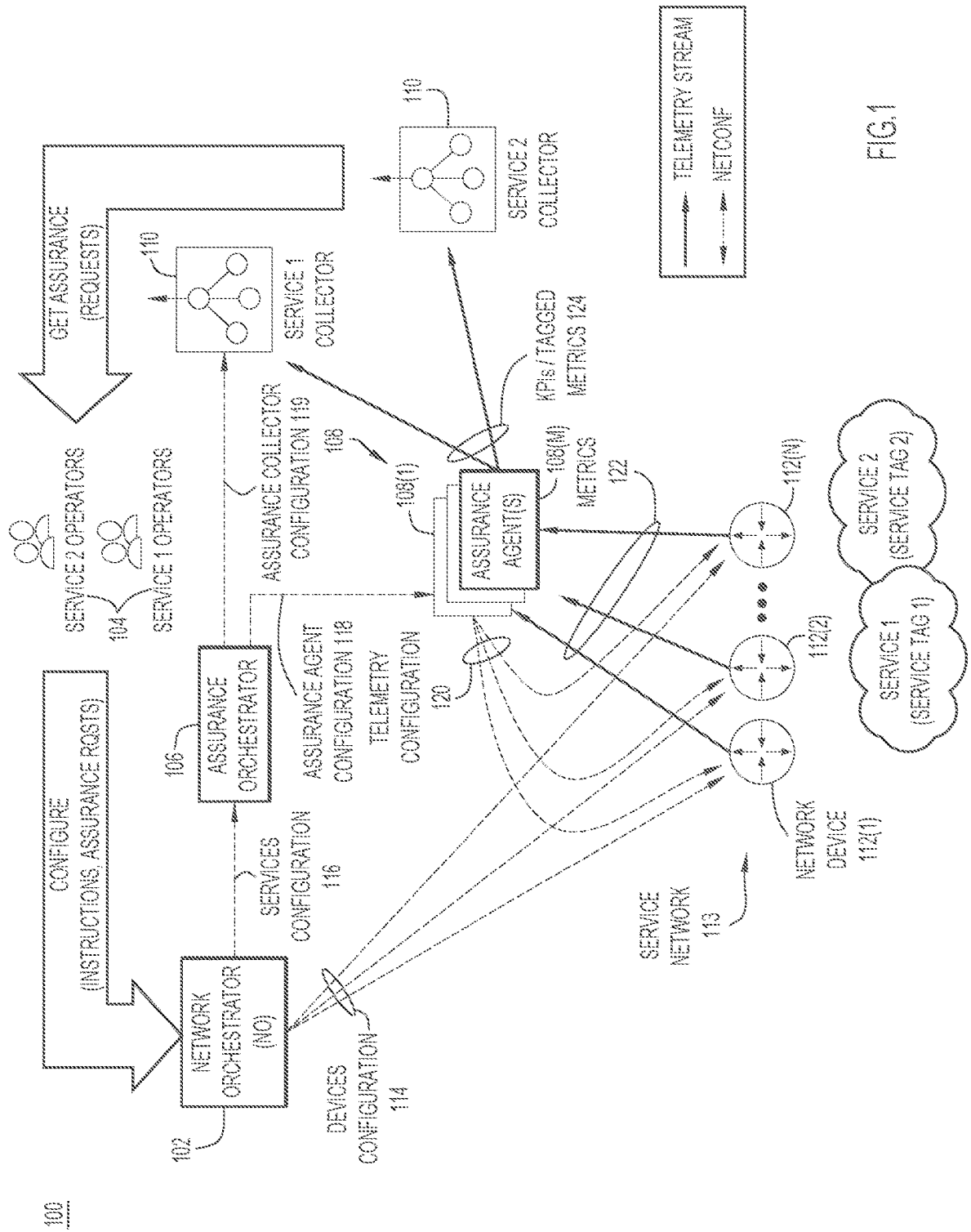
FIG. 1 is a block diagram of a system configured to perform assurance of services running in a network, according to an example embodiment.

Referring now to FIG. 1, a diagram is shown of a service assurance system 100 according to an example embodiment. With reference to FIG. 1, there is a block diagram of an example network service assurance system or architecture (also referred to herein as a "service assurance system" 100). Service assurance system 100 may provide service assurance for and intent-based network, for example. The service assurance system 100 leverages programming capabilities of network devices in the intent-based network (also referred to as a "service network" or simply a "network"), and model/event driven telemetry from the network devices, to deliver end-to-end service assurance for various services. Assurance system 100 includes a network orchestrator (NO) 102, service operators 104 to provide instructions to the NO 102, an assurance orchestrator 106 that communicates with the NO 102, assurance agents 108(1)-108(M) (collectively, assurance agents 108) that communicate with the assurance orchestrator 106, assurance collectors 110 (also referred to as assurance collectors 110) that communicate with the assurance agents 108 and the service operators 104, and network devices 112(1)-112(N) (collectively, network devices 112) that communicate with the NO 102 and the assurance collectors 110. NO 102 configures network devices 112(1)-112(N) to implement an intent-based service network 113 enabled to provide a variety of services to end users. Network devices (nodes) 112 may include routers, switches, gateways, and other network devices (physical or virtual). Assurance orchestrator 106, assurance agents 108, and assurance collectors 110 are generally referred to as one or more "assurance entities."

NO 102 may include applications and/or services hosted on one or more server devices (more simply referred to as servers), for example, in a cloud-based data center. Assurance orchestrator 106 may also include applications and/or services hosted on one or more server devices, which may be the same as or different from the servers used by NO 102. Similarly, assurance collectors 110 may also include applications and/or services hosted on one or more servers, which may be the same or different from the servers used by assurance orchestrator 106. Assurance agents 108(1)-108(N) may each include applications and/or services hosted on one or more servers, and may be distributed geographically to be near respective ones of network devices 112(1)-112(N) enabled for services to be monitored under control of the assurance agents. NO 102, assurance orchestrator 106, assurance agents 108, assurance collectors 110, and network devices 112 may communicate with each other over one or more communication networks, including one or more wide area networks (WANs), such as the Internet, and one or more local area networks (LANs).

In the example of FIG. 1, service assurance system 100 supports multiple services, including service 1 and service 2 (collectively, "the services"). To this end, service operators 104 include a service 1 operator for service 1 and a service 2 operator for service 2, and assurance collectors 110 include a service 1 collector for service 1 and a service 2 collector for service 2. Service operators 104 (e.g., service 1 operator and service 2 operator) provide to NO 102 network and service intent-based instructions to setup/configure the services (e.g., service 1 and service 2) for end users. Service operators 104 also receive requests for assurance (e.g., "get assurance" requests) for the services from assurance collectors 110 (e.g., service 1 collector and service 2 collector), and forward the requests to NO 102.

Responsive to the aforementioned instructions and the requests sent by service operators 104, NO 102 derives and sends to network devices 112 intent-based network device configuration information 114 to configure the network devices/service network 113 for the services (e.g., for service 1 and service 2). In addition, NO 102 derives and sends to assurance orchestrator 106 service configuration information 116 for providing assurance for the services (e.g., service 1 and service 2) enabled on service network 113. Service configuration information 116 includes, for each service deployed or implemented on service network 113, respectively, a definition of the service, including a service type (e.g., a type of network connectivity), a service instance (e.g., an identifier or name of the service), and network configuration information that describes how the service is actually implemented of service network 113. That is, the definition of the configuration of the service is reflective of how the service is instantiated as a collection of the subservices in service network 113.

For network device configuration information 114, NO 102 may employ, for example, the Network Configuration Protocol (NETCONF) to push intent-based network device configuration objects, such as Yet Another Next Generation (YANG) models or objects, to network devices 112. Similarly, for services configuration information 116, NO 102 may also employ, for example, NETCONF to push intent-based service configuration YANG objects to assurance orchestrator 106. YANG is a data modeling language used to define data sent over a NETCONF compliant network to configure resources. NETCONF is used to install, manipulate, and delete configurations of the resources, while YANG is used to model both configuration and state data of the resources.

In response to receiving the monitoring objects in telemetry configuration information 120, network devices 112 record the subservice metrics specified in the monitoring objects, and report the subservice metrics (labeled as "metrics" 122 in FIG. 1) back to assurance agents 108 in telemetry streams. In an example, the telemetry streams carry subservice metrics 122 in telemetry objects corresponding to the monitoring objects. In turn, assurance agents 108 tag subservice metrics 122 with service tags to indicate which of the subservice metrics are associated with/belong to which of the services, to produce service-tagged subservice metrics 124 (labeled "tagged metrics" in FIG. 1). In other words, assurance agents 108 apply the service tags to the subservice metrics for the services to which the service tags belong. In the example in which subservice metrics 122 are carried in telemetry objects, assurance agents 108 tag the telemetry objects with the service tag to produce service-tagged telemetry objects). Thus, the service tags provide service context to the subservice metrics.

In one embodiment, assurance agents 108 do not perform any specific analysis on the subservice metrics, leaving such analysis to assurance collectors 110 and/or assurance orchestrator 106. In another embodiment, assurance agents 108 perform analysis on subservice metrics 122 as instructed by the heuristic packages, to produce health states of the subservices (e.g., KPIs used as indicators of subservice health states) to which the subservice metrics pertain. Assurance agents 108 provide to assurance collectors 110 service-tagged subservice metrics 124, along with health states of the subservices when computed by the assurance agents. For example, assurance agents 108 provide flows of service-tagged subservice metrics tagged with service tag 1 to indicate service 1 to service 1 collector, and service-tagged subservice metrics tagged with service tag 2 to indicate service 2 to service 2 collector. Assurance agents 108 may also provide service-tagged subservice metrics 124 to assurance orchestrator 106.

Assurance orchestrator 106 operates as a central controller for assurance of the services deployed on service network 113. That is, assurance orchestrator 106 employs "service awareness" to control assurance for the services deployed on service network 113. In this role, assurance orchestrator 106 performs several main operations. First, assurance orchestrator 106 generates, from the service type and the service instance in the definition of each service defined in service configuration information 116, a unique service tag for the service. In an example, the service tag for a given service may be a tuple that includes the service type and the service instance from the definition of the given service. The service tag may be used to distinguish the service to which it pertains from all other services.

Second, assurance orchestrator 106 decomposes the definition of each service defined in service configuration information 116 into a respective subservice dependency graph of subservices and dependencies/interdependencies between the subservices that collectively (actually) implement the service on a network. That is, assurance orchestrator 106 dissects each service into the respective subservice dependency graph. The subservice dependency graph includes (subservice) nodes that represent the subservices and links between the nodes that represent the dependencies between the subservices. The subservice dependency graph may include the service type and the service instance (e.g., the service tag) for the service represented by the subservice dependency graph. To assist with the aforementioned decomposition, assurance orchestrator 106 may poll or query various network devices identified in the definition to discover subservices, such as packet routing protocols, implemented on the network devices and that are to be incorporated into the subservice dependency graph.

In a non-limiting embodiment, the subservice dependency graph includes a subservice dependency tree having a root node that represents the services, and nodes that represent the subservices and that have parent-child relationships (i.e., the dependencies) between the nodes/subservices that lead back to the root node. Other types of graph constructs/data structures may be used to represent the subservice dependency graph, as would be appreciated by one of ordinary skill in the art having read the present application.

Third, assurance orchestrator 106 derives from each subservice dependency graph a respective set of heuristic packages for the service described by the subservice dependency graph. The heuristic packages (i) specify/define service-related metrics (i.e., subservice metrics) to be monitored/recorded and reported by the subservices, and that are indicative of health statuses/states of the subservices, i.e., that are indicators of health states of the subservices, (ii) include rules to determine/compute key performance (KPIs) including the health states of the subservices (also referred to individually as a "subservice health state," and collectively as "subservice health states") based on the subservice metrics as recorded and reported, and (iii) which sensor paths (i.e., telemetry paths) are to be enabled for reporting telemetry, i.e., to report the subservice metrics recorded by the subservices from the subservices. The heuristic packages may also include or be associated with the service tag for the service to which the heuristic packages correspond. Assurance orchestrator 106 employs the heuristic packages to configure assurance agents 108 to monitor the subservices of the services, and to compute the health states of the subservices based on the monitoring, as described below.

Fourth, assurance orchestrator 106 provides to assurance agents 108 assurance agent configuration information 118 including the heuristic packages and their corresponding service tags in association with each other. Assurance orchestrator 106 may employ NETCONF to push the heuristic packages as YANG objects to assurance agents 108. Assurance orchestrator 106 may also provide the subservice dependency graphs to assurance collectors 110 in assurance collector configuration information 119.

Assurance agents 108 act as intermediary assurance devices between network devices 112, assurance collectors 110, and assurance orchestrator 106. More specifically, assurance agents 108 translate assurance agent configuration information 118, including the heuristic packages, to telemetry configuration information 120, and provide the telemetry configuration information to network devices 112, to configure the network devices 112 to record and report the subservice metrics mentioned above. For example, assurance agents 108 generate monitoring objects that define the subservice metrics to be recorded and reported by the subservices, and provide the monitoring objects to the subservices in telemetry configuration information 120, to configure the subservices to record and report the subservice metrics. Assurance agents 108 may maintain associations/bindings or mappings between the heuristic packages, the monitoring objects generated by the heuristic packages, and the services (e.g., service tags) to which the heuristic packages and the monitoring objects pertain. Assurance agents 108 may employ NETCONF (or RESTCONF), for example, to push YANG monitoring objects to network devices 112.

In response to receiving the monitoring objects in telemetry configuration information 120, network devices 112 record the subservice metrics specified in the monitoring objects, and report the subservice metrics (labeled as "metrics" 122 in FIG. 1) back to assurance agents 108 in telemetry streams. In an example, the telemetry streams carry subservice metrics 122 in telemetry objects corresponding to the monitoring objects. In turn, assurance agents 108 tag subservice metrics 122 with service tags to indicate which of the subservice metrics are associated with/belong to which of the services, to produce service-tagged subservice metrics 124 (labeled "tagged metrics" in FIG. 1). In other words, assurance agents 108 apply the service tags to the subservice metrics for the services to which the service tags belong. In the example in which subservice metrics 122 are carried in telemetry objects, assurance agents 108 tag the telemetry objects with the service tag to produce service-tagged telemetry objects). Thus, the service tags provide service context to the subservice metrics.

Figure 2:
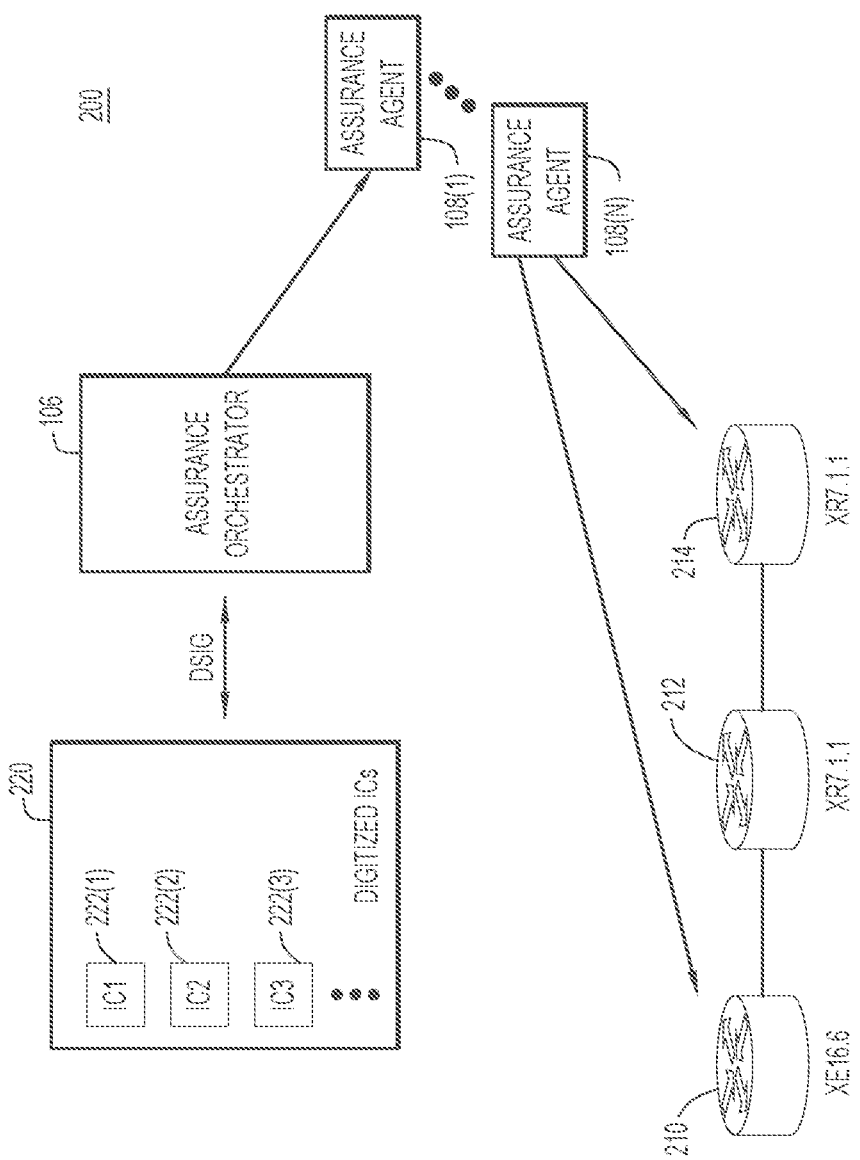
FIG. 2 is a block diagram showing use of an assurance orchestrator of the system shown in FIG. 1, to leverage digitized ICs to provide assurance of one or more services in a network, according to an example embodiment.

Reference is now made to FIG. 2. FIG. 2 shows an application of the assurance system 100 to digitized Intellectual Capital (ICs), according to an example embodiment. Diagnostic Signatures (DSIGs) are a means to proactively monitor services (and their associated subservices). Diagnostic Signatures are model-driven, machine-consumable pieces of IC that describe either symptoms of a problem or conditions favorable for a problem to exist. Thus, digitized ICs are rules (that may take the form of software code modules) that detect and troubleshoot problems in network devices. The ICs are built over time based on knowledge obtained from supporting network devices in customer networks. In some examples, problem detection engines may leverage IC rules to detect problems in network device support data, and may run thousands of times per day. The detection engines may process data from many different types of devices, with each device configured differently per the customer's network.

In other words, the ICs address things such as known issues or best practices, and are created to provide differentiated or value-add services by running those ICs for expediting reactive support or to proactively provide additional services to customers who have purchased and deployed network devices. The DSIGs are created and applied to "show tech" or other outputs collected from network devices to proactively identify any known defects affecting the customer's software version on the network devices. The show tech, which is short for the show tech-support command, is a command that displays diagnosis information for technical support by running relevant show commands on the hardware of the device.

Current techniques for applying digitized ICs involve collecting device-centric output (such as show tech output) to identify the software version and run all the ICs created for the specific version/platform. The ICs are applied on a per-node basis to detect whether the issue associated with the IC is applicable for the customer on that node/device. This lacks service visibility and does not help with end-to-end service assurance.

The heuristic packages, referred to above in connection with FIG. 1, are generally static. They are built from insight provided by subject matter experts. For example, the heuristic package may look to see whether traffic is within upper and lower bounds, may evaluate central processing unit (CPU) utilization, etc., to ultimately determine if the service is healthy. A static heuristic package may specify that some particular IC is applicable for a type of network setup. The static heuristic package may specify basic parameters like the configuration, check for a particular CLI, or get the syslog and check for a particular error message.

In scenarios in a large network, there are many aspects that affect service assurance, beyond a particular node. Currently, there is no way to detect that something that was sent by another node, is not received by a local node or not installed in the routing information base (RIB) table of a node. This is a more network-centric, instead of node-centric, view that can be achieved by the assurance system 100 depicted in FIG. 1.

The dynamic nature of the network is applied to the assurance system 100 using digital IC that is produced over time by a technical assistance/support center of a network equipment vendor. This enables the assurance system to capture intelligence from known incidents or points in time, such as bugs, etc. This intelligence is combined to create a dynamic heuristic package that can be used to obtain a richer set of health metrics about a particular service.

Presented herein are techniques that leverage the capabilities of the assurance system 100 and digitized ICs for service assurance. Embodiments are presented herein that leverage the business intent visibility and the holistic network/service visibility of the assurance system 100 to identify the relevant set of digitized ICs (which can be one or more DSIGs) on a per-service basis to create the heuristic packages that can be used by the assurance system 100 for service assurance. The embodiments presented herein augment the service assurance of the assurance system 100 by using digitized ICs, and in so doing, applies the digitized ICs in a service-centric manner. These techniques make the health checks very pertinent to the particular deployment based on a richer set of health metrics.

Reference is now made to FIG. 2. FIG. 2 illustrates a system 200 that includes the assurance orchestrator 106, assurance agents 108(1)-108(N), network elements (or "nodes") 210, 212 and 214, for example, and the digitized ICs collectively shown at 220. As an example, node 210 is running an operating system version "XE16.6", node 212 is running operation system version XR7.1.1 and node 214 is running operating system version XR7.1.1.

The digitized ICs 220 include a plurality of ICs, each of which may be associated with a particular technical issue or group of technical issues for a given functionality of the nodes 210, 212 and 214. For example, IC1 shown at 222(1) may be dedicated to a first technical issue (or group of technical issues), IC2 shown at 222(2) may dedicated to a second technical issue (or group of technical issues), IC3 shown at 222(3) may be dedicated to a second technical issue (or group of technical issues), and so on.

The assurance orchestrator 106 uses pre-condition logic to determine which one or more digital ICs 220, hereinafter referred to as "selected digital IC(s)," is/are relevant for a particular network and services running in the network. Through the assurance agents 108(1)-108(N), the assurance orchestrator 106 configures the network elements in the service path as needed based on the services and subservices in which they are participating. That data is collected and fed towards to the collectors (FIG. 1) or assurance agents 108(1)-108(N) to determine whether the collected data matches the digital signatures associated with the selected digital ICs. The assurance agents 108(1)-108(N) subscribe to the telemetry published by the network elements.

Figure 3:
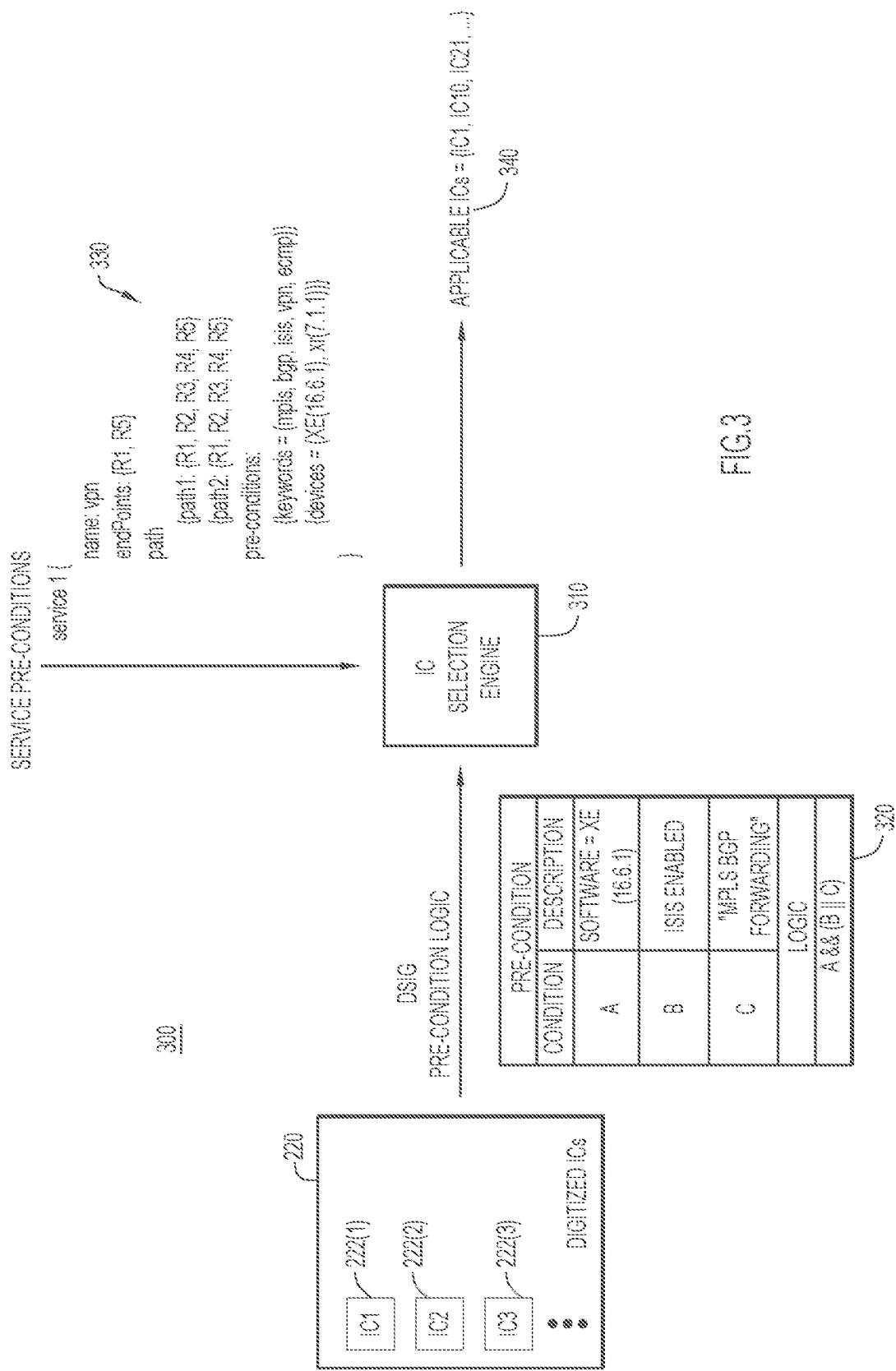
FIG. 3 is a diagram depicting an operational flow for selecting digital ICs to be applied for service assurance using knowledge about a service running in the network and digital signatures associated with digital ICs, according to an example embodiment.

Reference is now made to FIG. 3. FIG. 3 illustrates an operational flow 300 involving interaction between the digitized ICs 220 and an IC selection engine 310 that is executed by the assurance orchestrator 106. DSIGs are pre-populated with pre-condition logic as shown at 320. Each service can be mapped to one or more service pre-conditions, as shown at 330. The IC selection engine 310 scans the (relevant) DSIGs and maps them to subservices indicated in the service pre-conditions. Thus, the IC selection engine 310 identifies the relevant or applicable ICs, shown at 340, on a per service/subservice basis. The pre-condition logic 320 and the service pre-conditions 330 are used to determine whether an IC is applicable for any service or subservice. Each applicable ICs will be identified for each service/subservice.

As an example, FIG. 3 shows that the pre-condition logic for a given DSIG of a digital IC consists of 3 conditions, denoted Conditions A, B and C. Condition A is that the software/operating system is XE, version 16.1.1. Condition B is that Intermediate System-Intermediate System (IS-IS) is enabled on the network element, and Condition C is that the network be using "mpls bgp forwarding," indicating that Multi-Protocol Label Switching (MPLS) Border Gateway Protocol (BGP) forwarding is enabled on the network element. The DSIG pre-condition logic, as denoted in FIG. 3, expresses that Condition A needs to be present as well as one of Condition B and Condition C. The IC selection engine 310 evaluates the pre-condition logic 320 against the service pre-conditions 330. The example service pre-conditions 330 shown in FIG. 3 indicate that the service, denoted Service 1, with name: VPN between endpoints R1 and R5 involves two paths, path 1 and path 2, and keywords "mpls, bgp, isis, vpn, ecmp" and devices "XE(16.6.1) and XR(y.1.1)". Thus, in this example, there would be a match between the service pre-conditions 330 and the DSIG pre-condition logic 320 because the service pre-conditions 330 call for mpls, bgp and isis, and at least one of the network elements is using version 16.6.1 of software operating system XE. Using, for example, Boolean logic defined in the DSIG pre-condition logic 320, the IC selection engine 310 selects the one or more digital ICs that are associated with the DSIG pre-condition logic 320 due to this match to the service pre-conditions 330. Thus, as depicted in FIG. 3, the operational flow 300 determines whether a particular digital IC is applicable to a given service (as defined by service pre-conditions) running in a network.

The assurance orchestrator enables relevant "sensorpaths" (based on the device and the mapped subservice for the signature). The assurance agents are instructed with the expressions to monitor the subservices. The holistic results from multiple subservices derived based on the digital ICs are used for service assurance.

Figure 4:
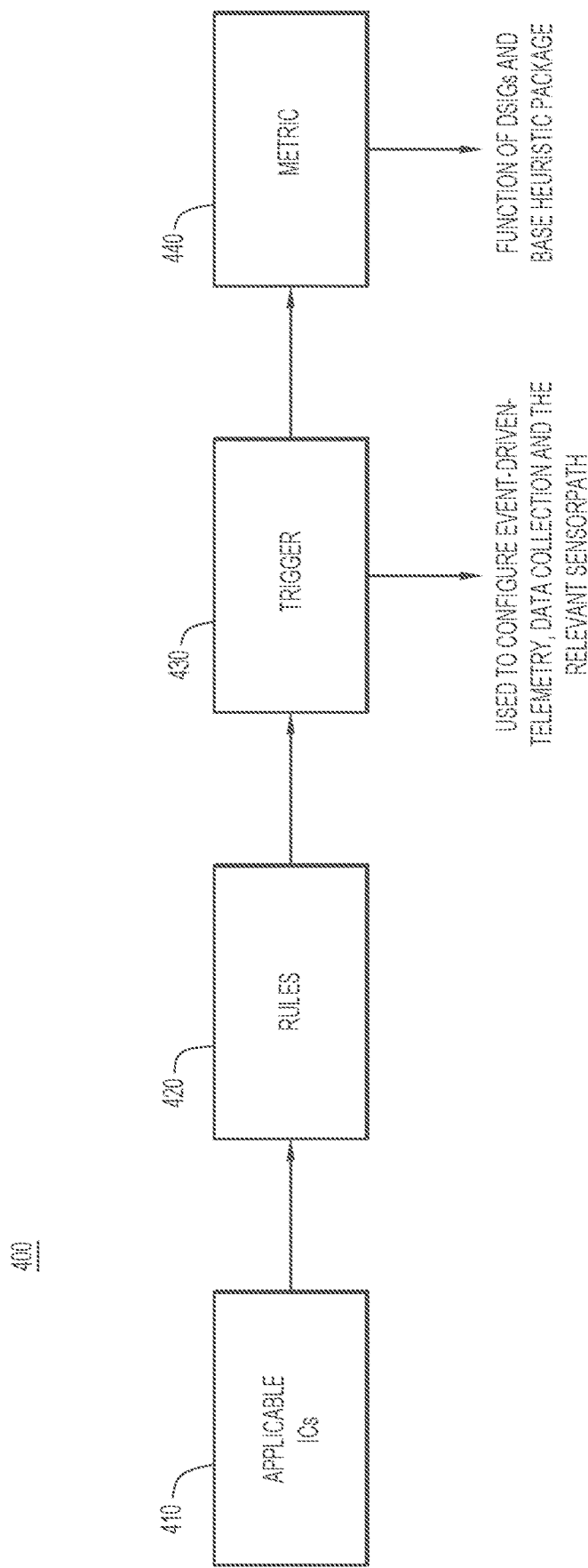
FIG. 4 is a flow diagram depicting how applicable digital ICs are used to derive metrics to be used for service assurance, according to an example embodiment.

Reference is now made to FIG. 4, which shows a process flow 400 once the applicable digital ICs are identified, at 410 according to the process depicted in FIG. 3. For each applicable digital IC, the rules shown at 420 and the associated trigger and metrics are derived as shown at 420 and 430. The trigger at 420 is used to configure event-driven telemetry (the relevant so-called sensorpaths) for data collection. The assurance orchestrator 106 creates dynamic heuristic packages based on the mapping between the DSIG pre-condition logic 320 and the service pre-conditions 330. This dynamic heuristic package defines the metric at 440 that is used, in addition to the base heuristic package, for subservice health detection. This will complement the KPIs that are already employed by the system 100 for a given subservice, as described above in connection with FIG. 1. Thus, as shown at 440 in FIG. 4, the metric is based on the DSIGs (dynamic heuristic package) and the base heuristic package(s) running in the system 100.

The result is an overall more comprehensive, more "live" view of subservice (and thus service) health. Said another way, consider that new issues are discovered for IS-IS on a specific platform or a specific version of code. Objectively, using the baseline KPIs built into the system 100, IS-IS on a given node may appear to be healthy. However, taken with the additional relevant DSIGs, IS-IS is actually potentially degraded, and that associated node can perhaps be de-prioritized for more critical traffic in order to maintain optimum service health.

The following is an example. Consider a "bug" denoted Distributed Defect Tracking System (DDTS) CSCvf80495 in which an Internet Protocol version 6 (IPv6) BGP network advertised is not seen in the peer; the prefix advertised by a peer is malformed in the remote peer. Thus, the bug DDTS CSCvf80495 is about malformed IPv6 Prefixes. When any XE device running version 16.6 is enabled with the IPv6 BGP protocol, some prefix may be malformed causing the neighbor BGP peer to drop and not install the same in its routing information base/(RIB)/forwarding table.

Thus, the Pre-Conditions for this bug/issue are:
Platform=XE
Version=16.6
BGP with IPv6 Address Family Identifiers (AFI) is enabled The Rules are: Check the configuration for BGP IPv6 AFI enabled and ensure that there is no additional out/in BGP policies applied on a local node or neighbor nodes (of that local node) from the configuration.

The Trigger is: Event triggered telemetry, where the event is a BGP RIB change on an XE device. An assurance agent subscribes to the BGP RIB event. Any change in BGP neighbor RIB will result in a new update to all of its neighbors. Thus, the Trigger(s) is/are created based on the rules, and express what needs to be checked in the network and when that needs to be checked.

The Metric is: Upon triggering the event, the assurance agent will also receive the RIB data from the neighbors and check if the entries are populated properly in the RIB/forwarding table. The Metric obtains the relevant details from the node(s) in the network based on the DSIG, and does comparison or evaluation of those details.

The above Rules, Trigger and Metric are considered along with the base heuristic package for any services that use IPv6 BGP as the protocol. The Metric is considered in addition to the overall health condition for end-to-end service assurance.

Reference is now made to FIG. 5, which illustrates a flow chart for a method 500, according to an example embodiment. At 510, the method involves obtaining service pre-conditions associated with a service to be supported in a network. The service pre-conditions specify one or more paths of one or more nodes in the network used for the service, one or more networking functions to be used in the network, and attributes of the one or more nodes used for the service. As described herein, a "networking function" is any networking function now known or hereinafter developed that may be performed by a node in a network, including Layer 2 functions, Layer 3 functions, Layer 4 functions, Layer 5 functions, and including, without limitation, the various networking functions described herein as well as tunnels.

At 520, the method includes providing a plurality of digital intellectual capital (IC) modules. Each digital IC module is configured to detect one or more specific operational issues in the network. At 530, the method includes providing (diagnostic) signature pre-condition logic that specifies one or more conditions that indicate relevancy of one or more digital IC modules.

At 540, the method includes selecting, from the plurality of digital IC modules, based on the service pre-conditions and the signature pre-condition logic, one or more particular digital IC modules that are applicable to the service in the network. At 550, the method includes determining information to be obtained from one or more nodes in the network based on the one or more particular digital IC modules, and at 560, the method includes obtaining the information from the one or more nodes in the network. At 570, the method includes analyzing the information obtained from the one or more nodes in the network to determine whether or not the one or more specific operational issues associated with the one or more particular digital IC modules, are present in the network for the service.

As explained above in connection with FIG. 4, the operation of determining information to be obtained from one or more nodes in the network may include generating one or more rules that specify configuration and/or functional attributes of a particular node and/or a neighboring node of the particular node to be evaluated; and generating, based on the one or more rules, one or more event triggers that specify one or more events associated with the particular node and/or the neighboring node, and upon which the configuration and/or functional attributes of the particular node or neighboring node are to be obtained. Furthermore, the operation of analyzing may include evaluating the configuration and/or functional attributes with one or more metrics.

Further, as explained above in connection with FIG. 1, the method may include decomposing the service into a plurality of subservices. In this case, operation 510 of obtaining the service pre-conditions, operation 540 of selecting, operation 550 of determining, operation 560 of obtaining the information and operation 570 of analyzing are performed for each of the plurality of subservices.

Moreover, the method 500 may further include: generating a base heuristic package for the service based on the plurality of subservices, the base heuristic package specifying one or more performance indicators to be monitored to assess overall health of the service in the network; and generating a dynamic heuristic package for the service based on the one or more particular digital IC modules that are applicable to the service in the network, the dynamic heuristic package specifying one or more indicators relevant to the one or more particular digital IC modules. In this case, the operation 570 of analyzing may include using base heuristic package to determine the overall health for end-to-end assurance of the service in the network and using the dynamic heuristic package to assess the one or more specific operational issues.

In one form, as described above in connection with FIG. 3, the service pre-conditions specify a name of the service, nodes in the network that are endpoints for the service, nodes in one or more paths of the network that use the service, names or descriptors of the networking functions to be performed for the service, and device model and operating system version of nodes in the network used for the service.

Furthermore, as described above in connection with FIG. 3, the signature pre-condition logic further specifies a Boolean logical relationship among a plurality of conditions to indicate relevancy of one or more digital IC modules.

The techniques presented herein have many advantages. Adding the dynamic heuristic package that can be derived from digital ICs can highlight, even proactively highlight, that a particular service or element within the service, could be unhealthy because it is susceptible to some bug. The dynamic heuristic package is tailored to a particular environment or particular deployment of a service. For example, customer A might be seeing a type of changes in the routing table of a node, and the same type of traffic pattern might not exhibit any bad health issues, whereas customer B has a different configuration and might be seeing some different interactions, indicative of degraded health.

The rules referred to above in connection with FIG. 4 may be applied dynamically. These rules can be fetched and applied dynamically based on what network functions a customer is running in the network. For example, if the customer is running IS-IS, then it is not necessary to load the digital signature for IS-IS, but instead load the signature for Open Shortest Path First (OSPF), or a particular configuration of IS-IS or OSPF is running, so only load and run the signature relevant for that configuration/version.

The assurance orchestrator determines the preconditions, and then determine/identify the relevant digital ICs which in turn have certain rules. The assurance orchestrator then configures the relevant triggers on the relevant nodes and configure the assurance agent(s) to monitor the published data from the relevant devices.

FIG. 6 illustrates a hardware block diagram of a computing device 600 that may perform functions of the assurance orchestrator 106, described above in connection with the operations depicted in FIGS. 1-5. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the control logic 617 that controls and performs operations of the assurance orchestrator 106, may be stored in memory 616 or persistent storage 618 for execution by processor(s) 614. When the processor(s) 614 execute the control logic for the assurance orchestrator 106, the processor(s) 614 are caused to perform the assurance orchestrator functions described above in connection with FIGS. 1-5.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Again, the techniques presented herein involve using digitized IC as input to determine if the IC applies to the service offered by the network. If so, the relevant trigger and metrics are derived to configure the assurance agents for service assurance.

In summary, in one form, a method is provided comprising: obtaining service pre-conditions associated with a service to be supported in a network, the service pre-conditions specifying one or more paths of one or more nodes in the network used for the service, one or more networking functions to be used in the network, and attributes of the one or more nodes used for the service; providing a plurality of digital intellectual capital (IC) modules, each digital IC module being configured to detect one or more specific operational issues in the network; providing signature pre-condition logic that specifies one or more conditions that indicate relevancy of one or more digital IC modules; selecting, from the plurality of digital IC modules, based on the service pre-conditions and the signature pre-condition logic, one or more particular digital IC modules that are applicable to the service in the network; determining information to be obtained from one or more nodes in the network based on the one or more particular digital IC modules; obtaining the information from the one or more nodes in the network; and analyzing the information obtained from the one or more nodes in the network to determine whether or not the one or more specific operational issues associated with the one or more particular digital IC modules, are present in the network for the service.

In another form, an apparatus is provided comprising: a communication interface configured to enable communications with one or more nodes in a network; and a processor coupled to the communication interface, the processor configured to perform operations including: obtaining service pre-conditions associated with a service to be supported in the network, the service pre-conditions specifying one or more paths of one or more nodes in the network used for the service, one or more networking functions to be used in the network, and attributes of the one or more nodes used for the service; obtaining a plurality of digital intellectual capital (IC) modules, each digital IC module being configured to detect one or more specific operational issues in the network; obtaining signature pre-condition logic that specifies one or more conditions that indicate relevancy of one or more digital IC modules; selecting, from the plurality of digital IC modules, based on the service pre-conditions and the signature pre-condition logic, one or more particular digital IC modules that are applicable to the service in the network; determining information to be obtained from one or more nodes in the network based on the one or more particular digital IC modules; obtaining the information from the one or more nodes in the network; and analyzing the information obtained from the one or more nodes in the network to determine whether or not the one or more specific operational issues associated with the one or more particular digital IC modules, are present in the network for the service.

In still another form, one or more non-transitory computer readable storage media s provided which stores instructions that, when executed by a processor, cause the processor to perform operations including: obtaining service pre-conditions associated with a service to be supported in a network, the service pre-conditions specifying one or more paths of one or more nodes in the network used for the service, one or more networking functions to be used in the network, and attributes of the one or more nodes used for the service; providing a plurality of digital intellectual capital (IC) modules, each digital IC module being configured to detect one or more specific operational issues in the network; providing signature pre-condition logic that specifies one or more conditions that indicate relevancy of one or more digital IC modules; selecting, from the plurality of digital IC modules, based on the service pre-conditions and the signature pre-condition logic, one or more particular digital IC modules that are applicable to the service in the network; determining information to be obtained from one or more nodes in the network based on the one or more particular digital IC modules; obtaining the information from the one or more nodes in the network; and analyzing the information obtained from the one or more nodes in the network to determine whether or not the one or more specific operational issues associated with the one or more particular digital IC modules, are present in the network for the service.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   decomposing a service to be supported in a network into a plurality of subservices;
   obtaining service pre-conditions associated with each of the plurality of subservices, the service pre-conditions specifying one or more paths of one or more nodes in the network used for the service, one or more networking functions to be used in the network, and attributes of the one or more nodes used for the service;
   providing a plurality of digital intellectual capital (IC) modules, each digital IC module being configured to detect one or more specific operational issues in the network;
   providing signature pre-condition logic that specifies one or more conditions that indicate relevancy of one or more digital IC modules; and
   for each of the plurality of subservices:
      selecting, from the plurality of digital IC modules, based on the service pre-conditions and the signature pre-condition logic, one or more particular digital IC modules that are applicable to the service in the network;
      determining information to be obtained from one or more nodes in the network based on the one or more particular digital IC modules;
      obtaining the information from the one or more nodes in the network; and
      analyzing the information obtained from the one or more nodes in the network to determine whether or not the one or more specific operational issues associated with the one or more particular digital IC modules, are present in the network for the service.

2. The method of claim 1, wherein determining information to be obtained from the one or more nodes in the network includes:
   generating one or more rules that specify at least one of configuration and functional attributes of at least one of a particular node and a neighboring node of the particular node to be evaluated; and
   generating, based on the one or more rules, one or more event triggers that specify one or more events associated with the at least one of the particular node and the neighboring node, and upon which the at least one of configuration and functional attributes of the particular node or the neighboring node are to be obtained.

3. The method of claim 2, wherein analyzing includes evaluating the at least one of configuration and functional attributes with one or more metrics.

4. The method of claim 1, wherein the one or more nodes include one or more routers, switches, and gateways.

5. The method of claim 1, further comprising:
   generating a base heuristic package for the service based on the plurality of subservices, the base heuristic package specifying one or more performance indicators to be monitored to assess overall health of the service in the network; and
   generating a dynamic heuristic package for the service based on the one or more particular digital IC modules that are applicable to the service in the network, the dynamic heuristic package specifying one or more indicators relevant to the one or more particular digital IC modules.

6. The method of claim 5, wherein analyzing includes using the base heuristic package to determine the overall health for end-to-end assurance of the service in the network and using the dynamic heuristic package to assess the one or more specific operational issues.

7. The method of claim 1, wherein the service pre-conditions specify a name of the service, nodes in the network that are endpoints for the service, nodes in one or more paths of the network that use the service, names or descriptors of the networking functions to be performed for the service, and device model and operating system version of nodes in the network used for the service.

8. The method of claim 1, wherein the signature pre-condition logic further specifies a Boolean logical relationship among a plurality of conditions to indicate relevancy of one or more digital IC modules.

9. The method of claim 1, wherein obtaining the information from the one or more nodes in the network includes obtaining event-driven telemetry provided by the one or more nodes.

10. An apparatus comprising:
    a communication interface configured to enable communications with one or more nodes in a network; and
    a processor coupled to the communication interface, the processor configured to perform operations including:
       decomposing a service to be supported in the network into a plurality of subservices;
       obtaining service pre-conditions associated with each of the plurality of subservices, the service pre-conditions specifying one or more paths of one or more nodes in the network used for the service, one or more networking functions to be used in the network, and attributes of the one or more nodes used for the service;
       obtaining a plurality of digital intellectual capital (IC) modules, each digital IC module being configured to detect one or more specific operational issues in the network;
       obtaining signature pre-condition logic that specifies one or more conditions that indicate relevancy of one or more digital IC modules; and
       for each of the plurality of subservices:
          selecting, from the plurality of digital IC modules, based on the service pre-conditions and the signature pre-condition logic, one or more particular digital IC modules that are applicable to the service in the network;
          determining information to be obtained from one or more nodes in the network based on the one or more particular digital IC modules;
          obtaining the information from the one or more nodes in the network; and
          analyzing the information obtained from the one or more nodes in the network to determine whether or not the one or more specific operational issues associated with the one or more particular digital IC modules, are present in the network for the service.

11. The apparatus of claim 10, wherein the processor is configured to perform determining information to be obtained from the one or more nodes in the network by:
generating one or more rules that specify at least one of configuration and functional attributes of at least one of a particular node and a neighboring node of the particular node to be evaluated; and
generating, based on the one or more rules, one or more event triggers that specify one or more events associated with the at least one of the particular node and the neighboring node, and upon which the at least one of configuration and functional attributes of the particular node or the neighboring node are to be obtained.

12. The apparatus of claim 11, wherein the processor is configured to perform the analyzing by evaluating the at least one of configuration and functional attributes with one or more metrics.

13. The apparatus of claim 10, wherein the processor is configured to perform
obtaining the information from the one or more nodes in the network by obtaining event-driven telemetry provided by the one or more nodes.

14. The apparatus of claim 10, wherein the processor is further configured to perform operations including:
generating a base heuristic package for the service based on the plurality of subservices, the base heuristic package specifying one or more performance indicators to be monitored to assess overall health of the service in the network; and
generating a dynamic heuristic package for the service based on the one or more particular digital IC modules that are applicable to the service in the network, the dynamic heuristic package specifying one or more indicators relevant to the one or more particular digital IC modules.

15. The apparatus of claim 14, wherein the processor is configured to perform the analyzing using the base heuristic package to determine the overall health for end-to-end assurance of the service in the network and using the dynamic heuristic package to assess the one or more specific operational issues.

16. One or more non-transitory computer readable storage media storing instructions that, when executed by a processor, cause the processor to perform operations including:
obtaining service pre-conditions associated with a service to be supported in a network, the service pre-conditions specifying one or more paths of one or more nodes in the network used for the service, one or more networking functions to be used in the network, and attributes of the one or more nodes used for the service;
providing a plurality of digital intellectual capital (IC) modules, each digital IC module being configured to detect one or more specific operational issues in the network;
providing signature pre-condition logic that specifies one or more conditions that indicate relevancy of one or more digital IC modules;
selecting, from the plurality of digital IC modules, based on the service pre-conditions and the signature pre-condition logic, one or more particular digital IC modules that are applicable to the service in the network;
generating a base heuristic package for the service based on a plurality of subservices of the service, the base heuristic package specifying one or more performance indicators to be monitored to assess overall health of the service in the network;
generating a dynamic heuristic package for the service based on the one or more particular digital IC modules that are applicable to the service in the network, the dynamic heuristic package specifying one or more indicators relevant to the one or more particular digital IC modules;
determining information to be obtained from one or more nodes in the network based on the one or more particular digital IC modules;
obtaining the information from the one or more nodes in the network; and
analyzing the information obtained from the one or more nodes in the network to determine whether or not the one or more specific operational issues associated with the one or more particular digital IC modules, are present in the network for the service.

17. The one or more non-transitory computer readable storage media of claim 16, wherein the instructions for determining information to be obtained from the one or more nodes in the network include instructions operable for:
generating one or more rules that specify at least one of configuration and functional attributes of at least one of a particular node and a neighboring node of the particular node to be evaluated; and
generating, based on the one or more rules, one or more event triggers that specify one or more events associated with the at least one of the particular node and the neighboring node, and upon which the at least one of configuration and functional attributes of the particular node or the neighboring node are to be obtained.

18. The one or more non-transitory computer readable storage media of claim 17, wherein the instructions for performing the analyzing include instructions for evaluating the at least one of configuration and functional attributes with one or more metrics.

19. The one or more non-transitory computer readable storage media of claim 16, further comprising instructions that, when executed by the processor, cause the processor to perform operations including:
decomposing the service into the plurality of subservices, wherein the obtaining the service pre-conditions, the selecting, the determining, the obtaining the information and the analyzing are performed for each of the plurality of subservices.

20. The one or more non-transitory computer readable storage media of claim 16,
wherein the instructions for performing the analyzing include instructions for using the base heuristic package to determine the overall health for end-to-end assurance of the service in the network and using the dynamic heuristic package to assess the one or more specific operational issues.

* * * * *